March 31, 1953 R. DEIBEL 2,632,911
LIQUID APPLYING WINDSHIELD CLEANER
Filed Jan. 8, 1949
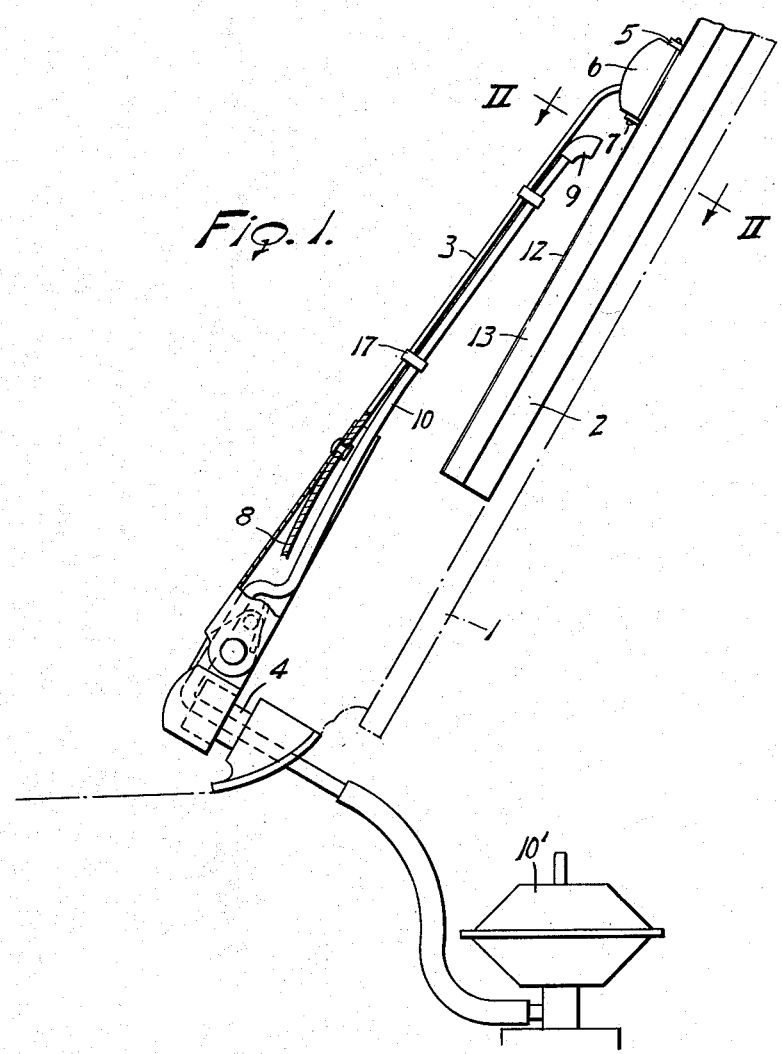
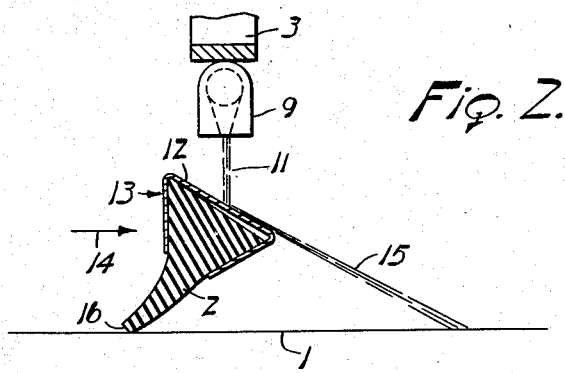
INVENTOR
Raymond Deibel
BY
Bean, Brooks, Buckley & Bean.
ATTORNEYS Patented Mar. 31, 1953

2,632,911

UNITED STATES PATENT OFFICE 2,632,911

LIQUID APPLYING WINDSHIELD CLEANER

Raymond Deibel, East Aurora, N. Y., assignor to Trico Products Corporation, Buffalo, N. Y.

Application January 8, 1949, Serial No. 69,854

6 Claims. (Cl. 15—250.4)

This invention relates to a windshield cleaner and more especially to one utilizing water or other liquid solvent to facilitate and expedite the removal of foreign matter from the field of vision.

The primary object of the invention is to so apply the solvent whereby uniformity of result and maximum efficiency are obtained.

Further, the invention aims to provide a windshield cleaner wherein the solvent applying means are incorporated in the wiping arrangement in a manner to enable the solvent being conveyed in proximity to its point of application and to simplify the installation of the arrangement on the vehicle.

The foregoing and other objects will manifest themselves as this description progresses, reference being made therein to the accompanying drawing, wherein Fig. 1 is a fragmentary view depicting the wiper in side view and incorporating the present inventive concept; and Fig. 2 is a sectional view through the wiper about on line II—II of Fig. 1.

Referring more particularly to the drawing, the numeral 1 designates the windshield of a motor vehicle, 2 the blade or wiper of a windshield cleaner, 3 the wiper actuating arm, and 4 the oscillating shaft which is power driven by suitable means, not shown. The wiping blade is provided with a pair of upstanding ears 5 on its back between which is disposed the arm attaching clip 6 to which it is pivotally connected by pivot means 7 so that the wiping blade will rock to a rearwardly inclined position at the beginning of each stroke, as indicated generally in Fig. 2. This rocking action is against the urge of the arm spring 8 which imposes the desired pressure in the wiping contact of the wiper upon the glass.

According to the present invention, water or other liquid solvent is applied to the glass in advance of the moving wiper. For this purpose, the delivery nozzle 9 is carried by the outer end of the wiper arm for effecting such delivery, such nozzle being connected by a tube 10 to a source of supply, such as a pump 10', preferably in the nature of a force feed system such as that shown in the earlier Patent No. 2,206,814. Such a system produces a stream or jet of liquid at a predetermined pressure and for a predetermined time delivery, but obviously any suitable means may be utilized for delivering liquid to the nozzle 9 with sufficient pressure to eject the liquid stream onto the glass.

To insure the stream being delivered to the windshield surface in advance of the moving wiper deflecting means are employed which are set in accordance with the wiper as it rocks at the beginning of each stroke. By this provision a single nozzle will suffice, the jet issuing from the nozzle being substantially normal to the windshield surface, as indicated at 11 in Fig. 2. The deflecting means is in the form of a flat surface 12 formed on the back of the blade and may therefore be a unitary part of the channeled holder 13 in which the rubber squeegee element 2 is positioned either fixedly or loosely. The ears 5, by which the wiping blade is rockingly mounted on its attaching clip 6 and therefore on the arm 3 since the clip is fixedly related to the arm, are rigid with the channeled holder 13. The liquid jet 11 impinges against the back surface 12 of the channeled holder and is thereby deflected onto the windshield surface in advance of the blade as it moves in the direction of the arrow 14, such deflected spray or stream being indicated at 15 in Fig. 2. At the beginning of the return stroke the blade will rock upon its wiping edge 16 and position the surface 12 at an opposite inclination for deflecting the normally projected stream 11 to the opposite side of the blade so as to wet the surface in front of the reversely moving wiper. The angle of inclination of the blade will be determined so that the stream deflecting surface will be properly positioned for diverting the liquid stream onto the glass in front of the advancing wiper. The arm attaching clip may be of any approved form for limiting the rocking of the wiper and definitely positioning the surface 12 for the intended purpose, such a clip being shown by way of example in the copending application of Robert B. Macpherson, Serial No. 655,637.

The liquid applying means moves with the actuating arm, being attached thereto in a suitable manner as by bands 17 and is designed to cooperate with the rockably mounted wiper of a well-known design. The installation of the windshield washing apparatus is therefore simplified. Furthermore, the nozzle requires but a single delivery orifice since the issuing stream is diverted from one side of the wiper to the other side thereof in accordance with the deflecting surface 12.

While the foregoing description has been given in detail it is without thought of limitation since the inventive principles involved are capable of assuming other physical embodiments without departing from the spirit of the invention and the scope of the appended claims.

What is claimed is:

1. A windshield cleaner comprising an elongate wiper having a liquid deflecting face extending transversely across its back, an actuating arm movable back and forth and supporting the wiper for rocking rearwardly about its longitudinal axis to dispose the deflecting face first in one deflecting position and then in another deflecting position, and a liquid spray nozzle carried by the arm for movement therewith and positioned above the wiper and directed to deliver a stream of liquid solvent in a plane substantially normal to the windshield upon the underlying deflecting face in either of its positions to be intercepted and diverted thereby onto the surface being wiped, said deflecting face acting in its two operative positions to deflect the liquid in front of the wiper as it moves back and forth.

2. A windshield cleaner having a reciprocating wiper mounted for rocking to a rearward inclined position at the beginning of each stroke, said wiper having a relatively fixed liquid intercepting and diverting surface reversingly positioned by such rocking movement to divert a stream of liquid solvent onto the windshield surface in advance of the wiper as it moves back and forth, and means spaced from and directed toward said surface for delivering a continuously flowing liquid stream onto such diverting surface in a direction for being so intercepted and diverted throughout each wiper stroke.

3. A windshield cleaner comprising a wiper, an oscillatory actuating arm rockably supporting the wiper for back and forth movement on a windshield surface, a spray nozzle movable with the arm and disposed coplanar with the arm and wiper to eject a spray of liquid solvent onto the back of the wiper in a plane substantially normal to the windshield, said wiper rocking to a rearwardly inclined wiping position at the beginning of each stroke and having a transverse deflecting surface on its back and in the path of the spray positioned to divert it to the windshield surface in advance of the moving wiper.

4. A windshield cleaner comprising a wiping blade having a transversely flat longitudinally extending back surface, an actuating arm, an arm attaching clip pivotally connecting the arm to the blade for moving the latter back and forth and causing the blade to assume a rearwardly inclined position and the flat back surface to assume a forwardly inclined position at the start of each stroke, said arm overlying the transversely flat surface, means for applying a spray of liquid solvent to the windshield including a nozzle carried by the arm and directing such spray substantially normal to the windshield upon the transversely flat back surface for being alternately deflected thereby into the path of the advancing blade on the windshield, and means limiting said inclined positions of said surface.

5. A windshield cleaner comprising an actuating arm, a wiper rockably mounted axially thereon for being moved back and forth on a windshield in rearwardly inclined wiping positions, said wiper having a liquid intercepting and diverting face rockable by the wiper at the start of each stroke to one or the other of two operative positions from which a stream of liquid may be deflected onto the windshield surface in advance of the moving wiper, and a nozzle directed toward said face for ejecting a stream of liquid solvent onto the diverting face for being so deflected with said face shielding the windshield from said stream rearwardly of said wiper, said nozzle being carried by the arm.

6. A windshield cleaner comprising an oscillatory actuating arm, a wiper in rocking engagement with said arm, a liquid spray nozzle carried by the arm and positioned above the wiper and directed in a plane substantially normal to the windshield, spray intercepting and directing means carried by said wiper in the path of the spray and reversingly positioned by said rocking to shield the windshield from the spray from the nozzle rearwardly of said wiper and to divert the intercepted spray in advance of the wiper onto the windshield as the wiper moves back and forth, and means for delivering liquid to said spray nozzle.

RAYMOND DEIBEL.

REFERENCES CITED

The following references are of record in the file of this patent:

UNITED STATES PATENTS

| Number | Name | Date |
|---|---|---|
| 1,246,829 | McWhirter | Nov. 13, 1917 |
| 1,801,373 | Stevens | Apr. 21, 1931 |
| 2,018,338 | Abdelnour | Oct. 22, 1935 |
| 2,285,618 | Scinta | June 9, 1942 |
| 2,348,502 | Smulski | May 9, 1944 |
| 2,399,399 | Smulski | Apr. 30, 1946 |

FOREIGN PATENTS

| Number | Country | Date |
|---|---|---|
| 273,701 | Italy | Apr. 29, 1930 |
| 321,596 | Italy | Oct. 10, 1934 |
| 410,259 | Great Britain | May 17, 1934 |
| 426,204 | Great Britain | Mar. 27, 1935 |